United States Patent [19]

Suzuki et al.

[11] 4,374,643
[45] Feb. 22, 1983

[54] COLOR SALTS OF BASIC DYES WITH ACIDIC OPTICAL BRIGHTENERS OF STILBENE TYPE

[75] Inventors: Kazuaki Suzuki, Osaka; Shohei Kuwabara, Suita, both of Japan

[73] Assignee: Showa Kagaku Kogyo Co., Ltd, Kawanishi, Japan

[21] Appl. No.: 284,532

[22] Filed: Jul. 20, 1981

[30] Foreign Application Priority Data

Jul. 22, 1980 [JP] Japan .................................. 55-99345

[51] Int. Cl.$^3$ ........................ C09B 23/14; D06P 1/41
[52] U.S. Cl. .......................................... 8/648; 8/638; 8/654; 8/657; 252/301.21; 252/301.23; 252/301.29
[58] Field of Search ................... 8/648, 638, 654, 657; 252/301.21, 301.23, 301.29

[56] References Cited

U.S. PATENT DOCUMENTS

| | | | |
|---|---|---|---|
| 3,467,642 | 9/1969 | Horisuchi et al. ....................... | 8/648 |
| 3,600,373 | 8/1971 | Zickendraht et al. ................... | 8/521 |
| 3,690,916 | 9/1972 | Wesmuller et al. ............ | 252/301.23 |
| 3,759,900 | 9/1973 | Horstman ....................... | 252/301.22 |
| 3,871,898 | 3/1975 | Reinert et al. ........................... | 8/648 |
| 4,306,875 | 12/1981 | De Feo et al. ........................... | 8/648 |

FOREIGN PATENT DOCUMENTS 45-06312 3/1970 Japan .

OTHER PUBLICATIONS

Venkataraman's "The Chemistry of Synthetic Dyes," vol. V, 1971 (Academic Press) pp. 536, 663–664.

*Primary Examiner*—A. Lionel Clingman
*Attorney, Agent, or Firm*—Wenderoth, Lind & Ponack

[57] ABSTRACT

This invention relates to a novel color salt or color complex consisting of an optical brightener component having at least one anionic group and a color component having at least one basic group capable of forming a salt with the anionic group. This color salt is capable of coloring various fibrous articles, paper, pulp, leathers, rubbers, adhesives and plastics in clear and brightened color.

6 Claims, No Drawings

COLOR SALTS OF BASIC DYES WITH ACIDIC OPTICAL BRIGHTENERS OF STILBENE TYPE

BACKGROUND OF THE INVENTION

1. Field of the Invention

This invention relates to a novel color salt consisting of an anionic optical brightener component and basic color component and more particularly, it is concerned with a color salt having the characteristics of an optical brightener component and a color component.

2. Description of the Prior Art

Up to the present time, it has been proposed to make clearer the color tone of a coloring matter by introducing into the molecule thereof optical brightening groups to form covalent bonds (Kuroki et al "Kogyo Kagaku Zasshi" 67 (2) page 67–71 (1964) and Yamada et al "Yuki Gosei Kagaku Kyokaishi" 29 (12) page 37–44 (1971), but this method has the disadvantage that not only synthesis of such a coloring matter is difficult, but also the intrinsic characteristics of both the components tend to be offset each other, since the introduction of optical brightening groups results in shifting of the absorption maximum wavelength of the optical brightener or color molecule, and has an influence upon the optical brightening strength and color tone of the former and the color tone of the latter.

Salts of anionic dyes and cationic dyes are described in Japanese Patent Publication No. 7675/1970 and Japanese Patent Publication No. 15827/1970. However, these color salts show a color tone completely different from that of the original dye used for the production thereof, and it is difficult to estimate the color tone of a color salt to be formed and thus to obtain a color salt with a desired color tone.

In addition, Japanese Patent Publication No. 6312/1970 describes a method of coloring fibers of cellulose acetate using a color salt consisting of an anionic dye and a specified cationic compound, and Japanese Patent Publication Nos. 45808/1972 and 1996/1973 describes salts of anionic optical brighteners of stilbene type with guadinine and salts of anionic optical brighteners with organo nitrogen compounds containing at least one nitrogen atom capable of forming a salt with the anionic group of the anionic optical brightener. Japanese Patent Publication No. 19362/1967 describes complex compounds of basic dyes with complex acids such as molybdophosphoric acid and tungstophosphoric acid. However, no reports have been made as to color salts consisting of anionic optical brighteners and basic dyes and accordingly, nobody knows the properties of these color salts.

SUMMARY OF THE INVENTION

It is an object of the present invention to provide a new color salt or color complex with a clear color tone.

It is another object of the present invention to provide a color salt or color complex consisting of an anionic optical brightener component and a basic color component.

It is a further object of the present invention to provide a color salt which holds the characteristics of an optical brightener component and color component.

It is a still further object of the present invention to provide a process of producing a color salt with a desired color tone in simple manner.

These objects can be attained by a color salt consisting of an optical brightener component having at least one anionic group and a color component having at least one basic group capable of forming a salt with the anionic group.

DETAILED DESCRIPTION OF THE INVENTION

When a coloring matter or an optical brightener is mixed with another coloring matter or another optical brightener to form a new composition, in general, their absorption curves in the visible range or ultraviolet range are interacted each other and the absorption maximum wavelengths are shifted, resulting in change of the color tone or optically brightening property. Thus it is very difficult to obtain a coloring agent or optical brightener with such a composition that the characteristics of the original components are held unchanged. Moreover, in a new coloring agent or optical brightener obtained by combining chemically a coloring agent or an optical brightener with another coloring agent or another optical brightener, it is natural that the above described change is brought on because the chemical structures are completely different.

In view of the foregoing phenomenon, the color salt of the present invention is also considered to have such a tendency that the original optical brightener component and color component are interacted each other to change the waveforms of the absorption curves and to shift the absorption maximum wavelengths, as described above, but it is surprisingly found that the color salt of the present invention has the absorption band of the original optical brightener component in the ultraviolet range and the absorption band of the original color component in the visible range and has no change in waveforms, nor shift in absorption maximum wavelengths. That is, it is found that the color salt of the present invention is a novel color salt having a clear and optically brightening color tone, in which the characteristics of the original optical brightener component and color component coexist. Therefore, the present invention will render great services to the industry in respect of producing a color salt with a desired color tone in simple manner.

Accordingly, the present invention provides a color salt or color complex consisting of an optical brightener component having at least one anionic group and a color component or dye component having at least one basic group capable of forming a salt with the anionic group.

The optical brightener component used in the present invention includes broadly compounds having at least one anionic group, for example, sulfonic acid group, carboxylic acid group or their alkali metal or ammonium salt group. These compounds have typically chemical structures of stilbene such as 4,4'-bistriazinylaminostilbene or 1,2,3-triazolylstilbene, 1,4-bisstyrylbenzene, 4,4'-bisstyrylbiphenylene, pyrazoline, coumarin, α,β-dioxazolyl- or diimidazolyl-ethylene, pyrene and naphthalic acid imide type.

The color component used in the present invention includes broadly compounds having at least one basic group capable of forming a salt with the anionic group of the above described optical brightener component, for example, cationized alkylamino group, acridine group, oxazine group, azine group, thiazine group or cationized nitrogen atom. These compounds have chemical structures of azo, anthraquinone, diphenylmethane, triphenylmethane, xanthene, acridine, azine, oxazine, thiazine, methine and phthalocyanine types. Above all, compounds of triphenylmethane type or xanthene type are most preferable.

Accordingly, the present invention provides a color salt or color complex consisting of an optical brightener component having at least one anionic group and a color component or dye component having at least one basic group capable of forming a salt with the anionic group.

The optical brightener component used in the present invention includes compounds having at least one anionic group, for example, sulfonic acid group or carboxylic acid group, or their alkali metal or ammonium salt groups. These compounds have chemical structures of azo, anthraquinone, diphenylmethane, triphenylmethane, xanthene, acridine, azine, oxazine, thiazine, methine and phthalocyanine types. Above all, compounds of triphenylmethane type or xanthene type are most preferable.

The color salt of the present invention can readily be prepared as follows: An optical brightener component having at least one anionic group is dissolved in water or in a mixed medium of water and a water-soluble organic solvent, optionally by heating, while a color component having at least one basic group capable of forming a salt with the above described anionic group is dissolved in water or in a mixed medium of water and a water-soluble organic solvent, optionally by heating. Both the resulting solutions are mixed optionally after filtration if there are insoluble matters. At this time, heating can optionally be carried out. In many cases, a salt-forming reaction takes place immediately between both the components to precipitate a color salt or color complex. Thus, it can be regarded as the end point of the salt-forming reaction when the optical brightening or color disappears nearly. This can readily be distinguished by observing a color stain when a filter paper is spotted with the mixed solution. The salt-forming reaction can also be carried out by adding an optical brightener component powder or a color component powder directly to a solution of a color component or optical brightener component. In the salt-forming reaction, it is not always required that all of anionic groups contained in an optical brightener component are completely reacted with basic groups in a color component and it does not matter how many anionic groups participate in the salt-forming reaction. However, it is required that at least one anionic group and basic group form a salt. For the salt-forming reaction, therefore, it is desirable to use an optical brightener component excessively so that the basic group of a color component is reacted with at most all of the anionic groups of an optical brightener, because discrimination of the end point of the reaction is thus made easy.

The color salt formed in this way, which is hardly soluble or not soluble in water in many cases, is separated from the reaction mixture by filtration in conventional manner and washed adequately with water to remove water-soluble matters. If necessary, it can readily be purified by the prior art method, for example, by recrystallization.

The thus resulting color salt of the present invention can be processed in a finished product with a similar form to the ordinary dye, depending on the intended use. That is to say, a color salt cake, which is reacted and separated as described above, is dried, ground and mixed optionally with a suitable builder and other additives to thus obtain a powdered product, is finely pulverized in the presence of water and a suitable surfactant in known manner to thus obtain a product in the form of an aqueous paste or an aqueous dispersion, or is dissolved in a suitable organic solvent to thus obtain a liquid product.

Useful examples of the water-soluble organic solvent which can be used in the salt-forming reaction or in the production of a liquid product of the color salt are methanol, ethanol, acetone, methyl ethyl ketone, dioxane, ethylene glycol, ethylene glycol monomethyl (or monoethyl) ether, acetamide, dimethyl (diethyl) acetamide, dimethyl (diethyl) formamide and dimethyl sulfoxide.

The color salt or color complex of the present invention is capable of dyeing or coloring in a clear color tone various fiber articles, cellulose acetate fibers, natural protein fibers such as silk and wool, synthetic polyamide fibers such as nylon fibers, and fibers of acrylonitrile polymer or copolymer, polyvinyl alcohol or polyurethane, and is useful as a coloring matter for coloring paper, pulp, leather, rubber and adhesive, for coloring various plastics, and for coloring raw solutions, as a pigment, or as a coloring matter for paints, inks, lacquers, colors or optical filters.

When the color salt of the present invention is applied to fibrous materials, in general, it is used in the form of an aqueous dispersion finely divided with a usual surfactant except in the case of solvent dyeing because it is hardly or not soluble in water, and as to the dyeing speed to fibers, it shows a more preferable levelling property than the original basic dye itself used for the production of the color salt. Therefore, the color salt of the present invention is free from nonuniform dyeing or spot-like coloring as one advantage, for example in a case where it is used for polyacrylnitrile fibers.

For dyeing polyacrylonitrile fibers is ordinarily used basic dyes in the form of a water-soluble salt, but, in general, the dyeing speed of these dyes to the above described fibers is such that a preferable level dyeing is hardly obtained, and this phenomenon of nonlevel dyeing is clearly observed, in particular, in the case of pale color dyeing (so-called pastel dyeing). In order to prevent this nonlevel dyeing, basic levelling agents such as long chain alkylammonium compounds or acidic levelling agents such as condensation products of formaldehyde and 2-naphthalenesulfonic acid are used, but the presence of such a retarding agent has various unfavourable influences upon dyeing baths. In a composite dyeing bath, for example, wherein there is a dye of a different form from basic dyes, such for example as acid dye, disperse dye or direct dye, this dye forms a salt with the above described retarding agent, which is precipitated to make the dyeing bath nonuniform and to cause a spot-like coloring. When using the color salt of the present invention, on the contrary, it is not required to add such a levelling agent because of its levelling property and a dyeing bath can always be held uniform to thus obtain a preferable level dyeing even in a composite dyeing system.

As well known in the art, basic dyes have a mortal disadvantage that the light fastness is low and thus their use is considerably limited in spite of having a clear color tone.

Similarly, it is assumed that the color salt of the present invention may have a low light fastness, but in actual fact, the light fastness of our color salt is rather improved and is somewhat higher than of a complex compound of a basic dye and a complex acid as described in Japanese Patent Publication No. 19362/1967. This is unexpectedly found not only in a case where the color salt of the present invention is applied to polyacrylonitrile substrates but also where it is applied to other substrates, for example, polyester, polyamide and cellulose substrates.

ing the same, in which measurement of $\lambda_{max}$ is carried out by dissolving 1 g of a sample in dimethylformamide (DMF) to give 200 ml of a DMF solution, taking 0.5 ml of this solution and diluting with water to 500 ml.

EXAMPLE 1

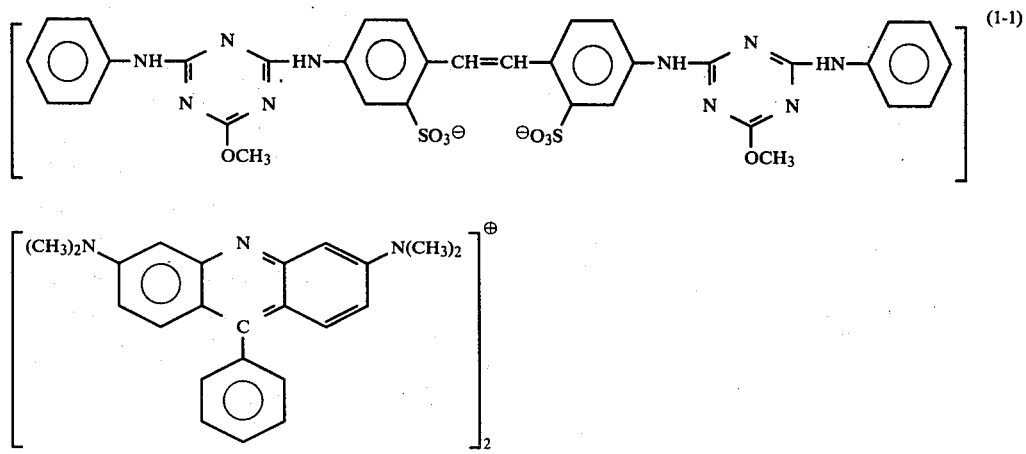

Furthermore, the color salt of the present invention is stable in a resin finishing bath used ordinarily for high quality finishing of fibrous materials. In this resin finishing, a salt of a heavy metal and a strong inorganic acid, for example, zinc chloride, zinc nitrate, magnesium chloride or hydrochloric acid is often used as a catalyst so as to accelerate the reaction of fibers with a resin. This catalyst affects unfavourably the coexistent dye. For example, a dye and heavy metal are reacted to form a salt precipitated. On the other hand, the color salt of the present invention being in a salt form is hardly affected by the above described catalyst. This is another advantage of the color salt of the present invention.

In the production of a finely dispersed product, the color salt of the present invention can be divided easily and finely in a shorter time as compared with the prior art disperse dye. This results in a level dyeing as mentioned above and the storage stability of the dispersion itself is more excellent.

The color salt of the present invention can be used as a coloring agent of various materials as discribed above individually or in combination with each other or other dyes. In particular, a blue or violet color salt is favourably used for the purpose of improving the visible whiteness of clay, kaolin or talc well known per se as a filler or surface treatment agent of paper or pulp. In this case, the color salt of the present invention can be added to a pulp in a beater with a filler for paper, such as clay, kaolin or talc, with reduction of the drainage load for paper making due to a good affinity of the color salt to the filler. Thus, the use of the color salt of the present invention serves to upgrade a low quality filler and consequently to reduce the paper making cost.

The following examples are given in order to illustrate the present invention in more detail without limit- 0.5 g of a color salt represented by the formula (1-1) was dissolved in 30 g of DMF and this solution was uniformly mixed with 70 g of trichloroethylene. A nylon plain weave fabric was impregnated with the resultant mixed solution at room temperature, aqueezed at a pick-up (liquid absorption ratio based on weight of dried fabric) of 60% and then dried in hot air at 40° to 80° C. The fabric was then subjected to a heat treatment at 190° C. for 30 seconds to fix thermally the color salt thereon and dyed in clean orange optically brightened. Similarly, cellulose acetate or polyester fibers or fabrics were clearly dyed in orange.

The color salt used in this example was prepared as follows: 16.3 g of a sodium salt of optical brightener which anionic component was represented by the formula (1-1) was dissolved in 500 ml of water at 60° to 70° C. On the other hand, 7.5 g of a basic dye (C. I. Basic Orange 14) which cationic component was represented by the formula (1-1) was dissolved in 200 ml of water. When the resulting dye solution was added with agitation to the above described solution of the optical brightener at 60° to 70° C., a salt forming reaction took place immediately to precipitate a color salt. When there was found no color stain in spotting a filter paper with the mixed solution, the color salt formed at about 60° C. was filtered, washed adequately with hot water and dried. The thus resulting color salt represented by the foregoing formula (1-1) had $\lambda_{max}$ in a mixed solvent of DMF and water; 492 nm, 345 nm and 245 nm.

In this example, when sodium salts of optical brighteners which anionic components were represented by the following formulas were reacted with the above described basic dye, there were obtained color salts which anionic components were represented by the following formulas:

| No. | Anionic Component | λmax (nm) |
|---|---|---|
| 1-2 | {C₆H₅-NH-[triazine, NHCH₂CH₂OH]-NH-C₆H₃(SO₃⁻)-CH=}₂ | 492,347 |
| 1-3 | {C₆H₅-NH-[triazine, N(CH₂CH₂OH)₂]-HN-C₆H₃(SO₃⁻)-CH=}₂ | 492,350 |
| 1-4 | {(SO₃⁻)C₆H₄-NH-[triazine, N(CH₂CH₂OH)₂]-HN-C₆H₃(SO₃⁻)-CH=}₂ | 492,350,265 |
| 1-5 | {H₃CO-[triazine, NHCH₂CH(OH)CH₃]-HN-C₆H₃(SO₃⁻)-CH=}₂ | 492,345 |
| 1-6 | {C₆H₅-O-[triazine, OCH₃]-HN-C₆H₃(SO₃⁻)-CH=}₂ | 492,342 |
| 1-7 | {morpholino-[triazine, morpholino]-HN-C₆H₃(SO₃⁻)-CH=}₂ | 492,350,235 |
| 1-8 | {Cl-[triazine, N(CH₂CH₂OH)₂]-HN-C₆H₃(SO₃⁻)-CH=}₂ | 492,347,240 |

The above described fibers or fabrics were treated with these color salts in an analogous manner and thus dyed in clear orange optically brightened.

EXAMPLE 2

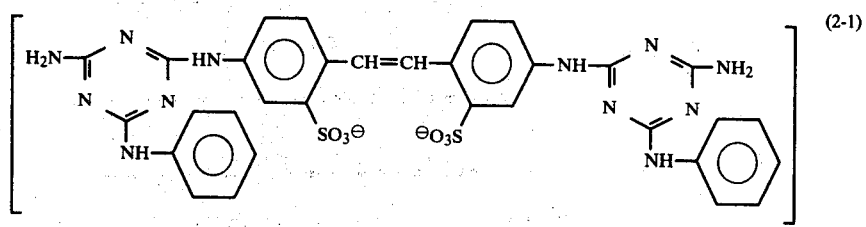

(2-1)

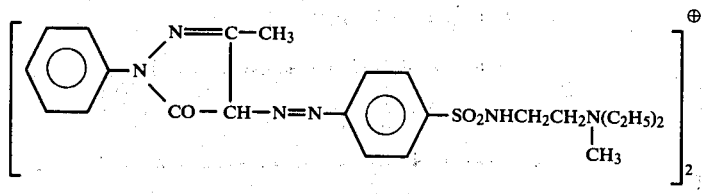

A color salt ($\lambda_{max}$: 387 nm, 345 nm, 245 nm) represented by the formula (2-1) was taken in an amount of 0.2% based on the weight of Cashmilon F yarn (polyacrylonitrile fiber), dissolved in a small amount of DMF and further diluted with water to give a bath ratio of 50:1. Cashmilon F yarn was added to a dyeing bath and dyed at 90° C. for 30 minutes, thus obtaining an optically brightened and clearly yellow yarn.

Cashmilon F yarn were treated with color salts obtained by reacting basic dyes which cationic components were represented by the following formulas with an optical brightener having the anionic component represented by the formula (2-1) in an analogous manner, and thus dyed in an optically brightened and clear color tone as shown in the following table:

| No. | Cationic Component | Color Tone |
|---|---|---|
| 2-2 | | red-violet |
| 2-3 | | violet |
| 2-4 | | blue |
| 2-5 | | blue |
| 2-6 | | |
| 2-7 | | violet |
| 2-8 | | blue |
| 2-9 | | green-blue |
| 2-10 | | yellow |

-continued

| No. | Cationic Component | | Color Tone |
|---|---|---|---|
| 2-11 | 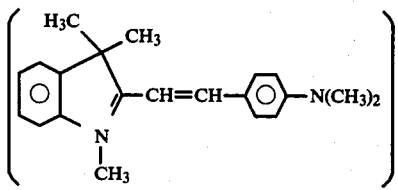 | ⊕ | red |
| 2-12 | 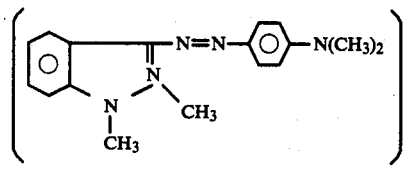 | ⊕ | red |
| 2-13 | 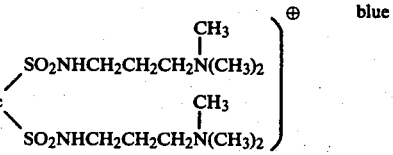 | ⊕ | blue |

In this example, a dyeing bath was prepared in such a manner that the above described color salt be in a proportion of 0.04% based on the weight of an article to be dyed and similar treatments were carried out to obtain a clear pastel color as shown in the above table.

EXAMPLE 3

| Urea | 100 g |
|---|---|
| Formalin (37%, neutral) | 200 g |
| Hexamethylenetetramine | 5 g | were mixed, heated and reacted to obtain a resis solution, and mixed or kneaded well in a kneader with the following composition:

| α-cellulose | 60 g |
|---|---|
| Ammonium chloride | 0.50 g |
| Zinc Stearate | 0.2 g |
| Zinc White | 0.5 g |

The resultant mixture was dried in a hot air drier at 80° C. for 90 minutes and ground by means of a pot mill. The resultant fine powder was mixed with a color salt ($\lambda_{max}$: 553.. nm, 350 nm) represented by the following formula (3-1) in a proportion of 0.2% by weight based on the whole composition. A urea resin molding obtained from this composition was colored in a clear violet-red.

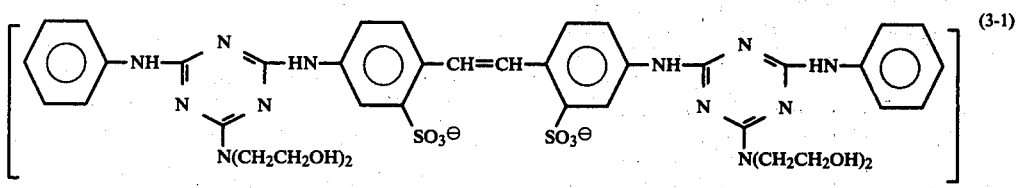

(3-1)

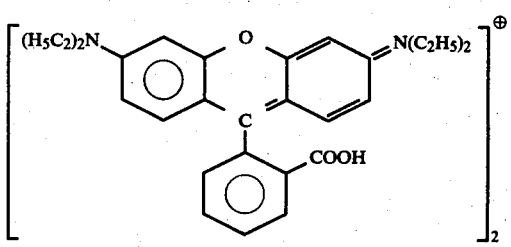

In this example, color salts obtained by reacting optical brighteners which anionic components were represented by the following formulas with the basic dye having the cationic component as shown by the foregoing formula (3-1) were also used:

| No. | Anionic Component | $\lambda max$ (nm) |
|---|---|---|
| 3-2 | 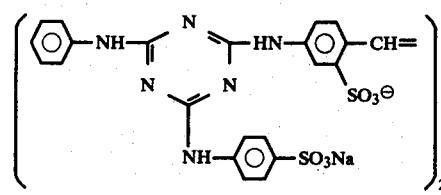 | 553.5,347,275 |
| 3-3 | | 553.5,350 |

| No. | Anionic Component | λmax (nm) |
|---|---|---|

[structure with phenyl-triazole-N-phenyl-CH= and SO₃⁻, H₃C on triazole]₂

3-4  553.5, 350

[stilbene with SO₃⁻]₂

3-5  553.5, 360

[stilbene derivative with OCH₂CH₂CH₂SO₃⁻ and ⁻O₃SCH₂CH₂CH₂O]

3-6  553.5, 360

[distyrylbenzene with ⁻OOCCH₂O and OCH₂COO⁻ groups]

For example, the color salt of the formula (3-2) in the above table was prepared as follows: 11.4 g of tetrasolium salt of an optical brightening agent which anionic component was represented by the formula (3-2) was dissolved in 500 ml of water at 60° to 70° C., while on the other hand, 9.6 g of a basic dye (C. I. Basic Violet 10) which cationic component was represented by the formula (3-1) was dissolved in 300 ml of water at 60° to 70° C. When this dye solution was added with agitation to the above described solution of the optical brightening agent at 60° to 70° C., a salt-forming reaction took place immediately to precipitate a color salt.

When there was found no color stain in spotting a filter paper with the mixed solution, the color salt was filtered after cooled to about 30° C., washed with saturated salt water and dried to obtain about 18.5 g of the color salt.

EXAMPLE 4

100 g of a powdered copolymer with a composition of 60% by weight of acrylonitrile and 40% by weight of vinyl chloride was dissolved in DMF.

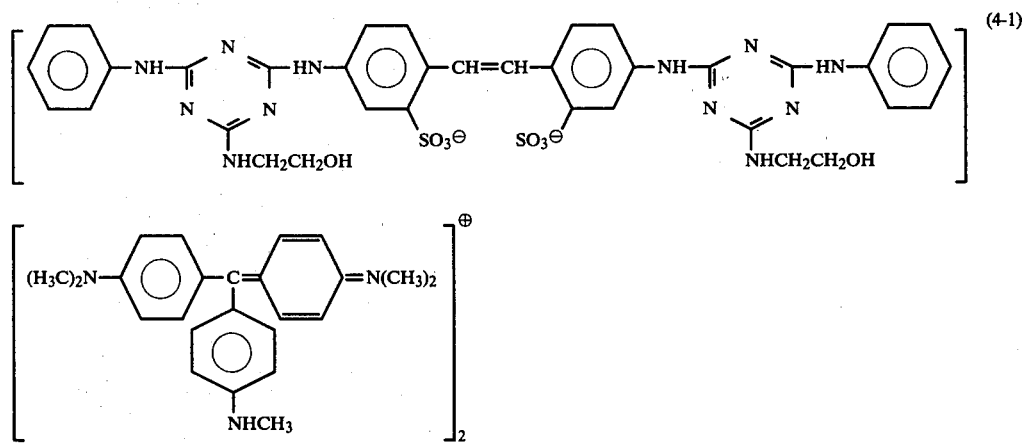

(4-1)

On the other hand, 0.5 g of a color salt ($\lambda_{max}$: 583 nm, 350 nm) represented by the above described formula (4-1) was dissolved in DMF and added to the above described copolymer solution in DMF to form a uniform solution. During the same time, the quantity of DMF was so adjusted that the copolymer concentration be 20%. This solution was spun in a spinning bath consisting of a 20% DMF aqueous solution at 20° C. from a nozzle with 300 holes. The thus resulting filaments were dried at 120° C., subjected to thermal stretching by 300% at the same temperature and then to heat treatment at 145° C. for 5 minutes, thus obtaining copolymer solution, for 1 hour after adding further 20 g of melamine, and for 30 minutes after adding 26 g of 37% formalin. Then, sulfuric acid was added thereto to adjust the pH to 5.6 and the condensation reaction was further carried out for about 8 hours. After the reaction, the precipitated and hardened resin product was filtered and washed with water. The thus resulting resin product was mixed with water to prepare a 10% suspension which was then mixed with 2.8 g of a color salt $\lambda_{max}$: 536 nm, 501 nm, 348 nm, 240 nm) represented by the following formula (5-1), followed by a heat treatment at 90° C. for 30 minutes:

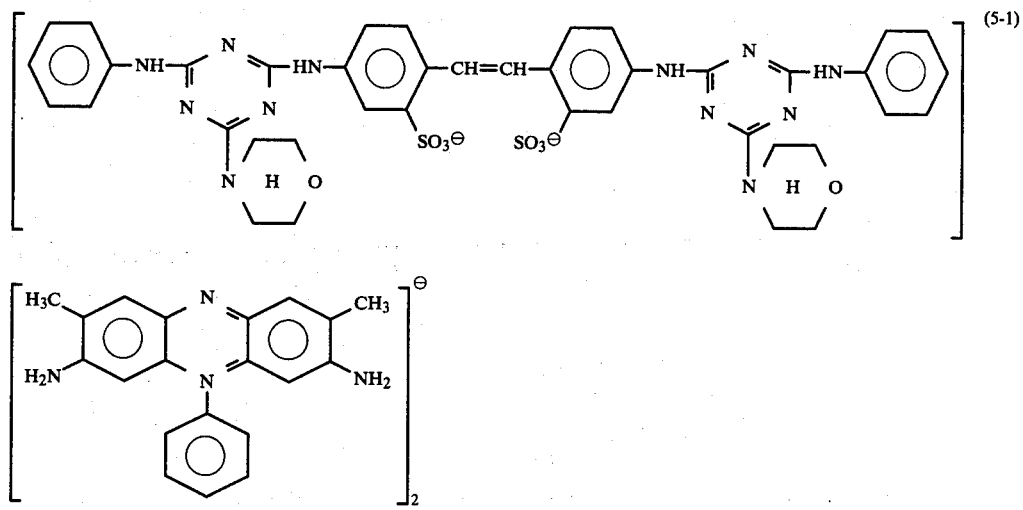

filaments colored in clear violet.

EXAMPLE 5

2.8 g of polyvinyl alcohol was dissolved in a mixed solution consisting of 238 g of DMF and 126 g of water, to which 30 g of p-toluenesulfonamide and 28 g of 37% formalin were added and caustic soda was further added so as to adjust the pH to 8.0, and the mixture was reacted for 2 hours at the boiling point of the mixed The resulting colored resin was dried in hot air and pulverized in a ball mill, thus obtaining a pigment powder brightened and colored in red.

In this example, the similar processings were carried out using color salts obtained by reacting the anionic component represented by the above described formula (5-1) and cationic components represented by the following formulas to thus obtain pigments with brightened color tone.

| No. | Cationic Component | Color Tone |
|---|---|---|
| 5-2 | [structure with (CH3)2N groups, N⊕, O] | blue |
| 5-3 | [structure with (C2H5)2H, =N(C2H5)2, NHC2H5]⊕ | blue |
| 5-4 | [structure with H3C, CH3 groups, C=CH—CH=CH—C, N-CH3]⊕ | red |

-continued

| No. | Cationic Component | Color Tone |
|-----|-------------------|------------|
| 5-6 | $\left( \begin{array}{c} \text{H}_3\text{C} \diagdown \underset{\text{C}}{\diagup} \text{CH}_3 \\ \text{[benzene ring]} \diagdown \text{C=CH—CH—HN—[benzothiazole]—CH}_3 \\ \underset{\text{CH}_3}{\text{N}} \end{array} \right)_2 \oplus$ | yellow |

Color salts obtained by reacting the basic dye having the cationic component in the formula (5-1) and optical brighteners having anionic components represented by the following formulas have respectively the color tone and $\lambda_{max}$ shown in the following table and can be used for the similar purpose:

| No. | Anionic Component | Color Tone | λ max (nm) |
|-----|-------------------|------------|------------|
| 5-6 | $\left( \text{H}_3\text{C.CONH—[ring]—[furanone]—[benzene]—SO}_3^\ominus \right)$ | red | 536, 501, 340 |
| 5-7 | $\left( \text{[naphthalene]—N=N—[ring]—[furanone]—[benzene]—SO}_3^\ominus \right)$ | red | 536, 501, 375 |
| 5-8 | $\left( \text{Cl—[benzene]—C=N} \diagdown \underset{\text{CH}_2—\text{CH(Ph)}}{\text{N}} —[benzene]—\text{SO}_3^\ominus \right)$ | red | 536, 501, 365 |
| 5-9 | $\left( \text{H}_3\text{CO—[naphthalene]—[imide]—NCH}_2\text{CH(OH)—SO}_3^\ominus \right)$ | red | 536, 501, 368 |

EXAMPLE 6

0.3 g of the color salt represented by the formula (3-1) in Example 3 was dissolved in a composition having the following recipe:

| | |
|---|---|
| Vinyl Chloride/Vinyl Acetate Copolymer Resin (density = 1.36 g/ml) | 59.7 g |
| Methanol | 40 ml |
| Isophorone (Volatile Solvent) | 100 ml |
| Cellosolve Acetate (Volatile Solvent) | 100 ml |
| Cyclohexanone (Volatile Solvent) | 100 ml |

To this mixture was with agitation added 100 g of silica gel with a mean particle size of 7 microns and an oil absorption of about 86 g/100 g. The dispersed slurry was removed onto a glass tray, where the volatile solvents were removed, and then heated in an oven at 105° C. to precipitate the color salt and non-volatile resin in the form of a solid solution in the gel pores. During the same time, stirring was carried out sometimes for the purpose of forming a uniform solid solution. After evaporation of the resin solvents, the dried pigment powder was sieved through a 400 mesh sieve. The pigment obtained in this way was a pink pigment powder with a thick, optically brightening property, containing the color salt in a proportion of about 0.19% by weight based on the solid solution.

20 g of the thus resulting pigment was dispersed in a vehicle consisting of 40 g of acrylic resin and 60 g of toluene and this dispersion was coated onto a white paper to give a thickness on dry base. On the other hand, a white paper was also coated with a pigment prepared in an analogous manner to this example except using a basic dye having the cationic component represented by the formula (3-1) in Example 3, i.e. Rhodamine B (C. I. Basic Violet 10) instead of the color salt of the present invention. In comparison of both the coated papers, the former showed a clearer color tone which optical reflection factor was about 5% higher, than the latter.

EXAMPLE 7

100 g of polystyrene chips, 1 g of titanium dioxide (rutile type) and 0.2 g of the color salt represented by the foregoing formula (3-3) were well mixed, rolled on rolls heated at 155° to 160° C., granulated and formed in a small plate by means of an injection molding machine at 240° to 250° C., thus obtaining a small plate of polystyrene colored in clear violet-red.

EXAMPLE 8

100 g of polyethylene granules for injection molding was mixed with 1 g of titanium dioxide (rutile type) in an overhead mixer, to which 0.5 g of a color salt represented by the following formula (8-1), and the mixture was molded in a small flat plate by an injection molding machine, thus obtaining a small plate of polyethylene colored in clear violet-blue:

EXAMPLE 10

(1) 100 g of clay (A) was dispersed in 50 ml of an aqueous solution containing 0.3 g of sodium hexametaphosphate, to which 40 ml of water containing 6 g of casein, 10 g of latex consisting of a copolymer of methyl methacrylate and butadiene and 1.0 g of a 25% aqueous ammonia solution were added. Water was further added to this mixture to adjust the solid concentration to 40%. The thus resulting coating composition was applied to one side of a high quality paper at room temperature to give a quantity of 15 g/m² by the use of a wire rod No. 14 and dried at 90° C. for 30 seconds to obtain a surface-coated paper (A').

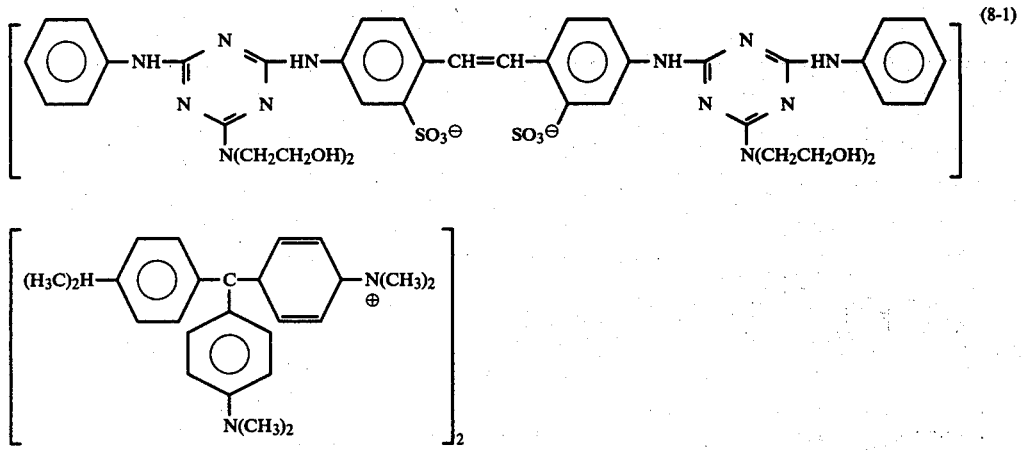

EXAMPLE 9

100 g of polyester granules consisting of polyethylene glycol terephthalate was uniformly mixed with 0.2 g of the color salt represented by the foregoing formula (5-7), melted with stirring at 285° C. and then subjected to spinning through an ordinary spinning nozzle, followed by stretching, thus obtaining polyester fibers colored in clear red.

(2) A surface coating composition was prepared in an analogous manner to the above described procedure (1) except using the same amount of clay (B) having a higher whiteness than clay (A) in place of clay (A) and coated onto a high quality paper under the similar condition to obtain a surface-coated paper (B').

(3) To the coating composition prepared in the same manner as in the procedure (1) was added an aqueous dispersion obtained by mixing and finely dividing 1.0 g of a color salt of the present invention, represented by the following formula (10-1):

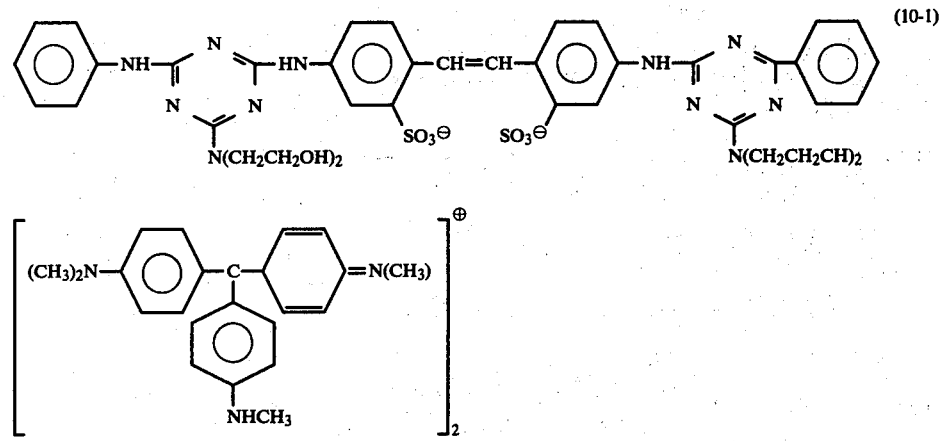

and 0.25 g of another color salt of the present invention, represented by the following formula (10-2):

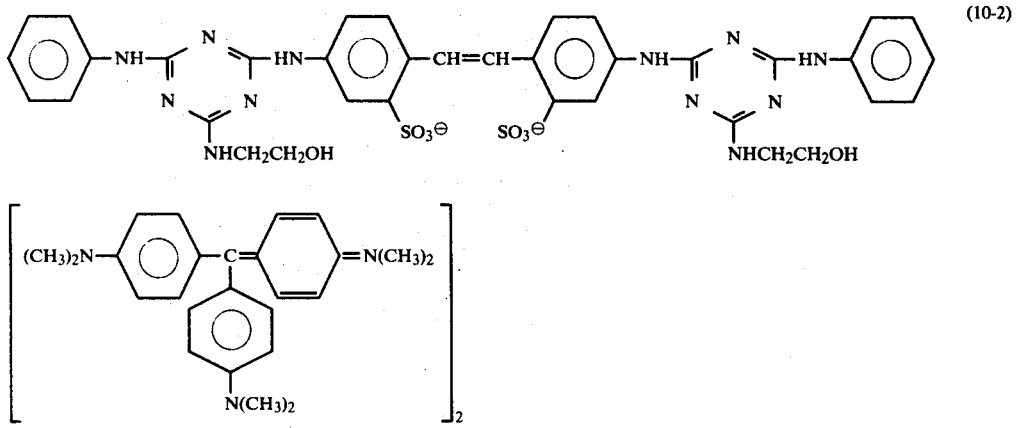

(10-2)

with water and a small amount of a nonionic surface active agent, in a proportion of 0.1, 0.4 and 0.8% based on the weight of the clay, thus obtaining surface-coating compositions each containing the color salt of the present invention. These coating compositions were applied to papers under the similar condition to obtain surface-coated papers (C'), (D') and (E').

The five surface-coated papers obtained by the above described procedures (1), (2) and (3) were subjected to measurement of three stimulation values X, Y and Z using a colorimetric color difference meter of Z-1001 DP type (manufactured by Nippon Denshoku Co., Ltd.) and the whiteness of the each coated paper was calculated by $$W = 4B - 3G$$

wherein W is the whiteness, B is a value of 0.847 Z and G is Y, thus obtaining results tabulated below:

| Surface-coated paper | Clay | Concentration of color salt based on weight of clay | Whiteness 4B − 3G |
|---|---|---|---|
| A' | A | 0% | 54.85 |
| B' | B | 0% | 66.94 |
| C' | A | 0.1% | 59.02 |
| D' | A | 0.4% | 68.02 |
| E' | A | 0.8% | 75.07 |

As can be seen from this table, the whiteness of the low quality clay (A) can be raised to that of the high quality caly (B) by the use of the color salt of the present invention in a proportion of about 0.4% by weight based on clay. Of course, the use thereof for clay (B) results in further increasing of the whiteness of clay (B).

What is claimed is:

1. A color salt consisting of a stilbene type optical brightener component having at least one anionic group and a color component having at least one basic group capable of forming a salt with the anionic group.

2. The color salt of claim 1, wherein the stilbene type optical brightener component has a chemical structure selected from 4,4'-bis-triazinylaminostilbene, 1,2,3-triazolylstilbene, 1,4-bis-styrylbenzene and 4,4'-bis-styrylbiphenylene.

3. The color salt of claim 1, wherein the anionic group is selected from sulfonic acid group, carboxylic acid group, their alkali metal salt groups and ammonium salt groups.

4. The color salt of claim 1, wherein the color component has a chemical structure selected from azo, anthraquinone, diphenylmethane, triphenylmethane, xanthene, acridine, azine, oxazine, thiazine, methine and phthalocyanine types.

5. The color salt of claim 1, wherein the cationic group is selected from cationized alkylamino group, acridine group, oxazine group, azine group, thiazine group and cationized nitrogen atom.

6. A process for the production of a color salt, which comprises mixing a solution of an optical brightener having at least one anionic group in water or water and a water-soluble organic solvent and a solution of a coloring agent having at least one basic group capable of forming a salt with the anionic group of the optical brightener in water or water and a water-soluble organic solvent.

* * * * *